United States Patent [19]

Okino

[11] Patent Number: 4,711,546
[45] Date of Patent: Dec. 8, 1987

[54] PHOTOMETRIC CIRCUIT

[75] Inventor: Tadashi Okino, Kanagawa, Japan

[73] Assignee: Canon Kabushiki Kaisha, Tokyo, Japan

[21] Appl. No.: 894,384

[22] Filed: Aug. 7, 1986

Related U.S. Application Data

[63] Continuation of Ser. No. 662,259, Oct. 18, 1984, abandoned.

[30] Foreign Application Priority Data

Oct. 19, 1983 [JP] Japan ................................. 58-195617
Nov. 11, 1983 [JP] Japan ................................. 58-210909
Nov. 11, 1983 [JP] Japan ................................. 58-210910

[51] Int. Cl.$^4$ ............................................. G03B 7/08
[52] U.S. Cl. ..................................... 354/425; 354/456
[58] Field of Search ............... 354/425, 427, 428, 456, 354/459, 460

[56] References Cited

U.S. PATENT DOCUMENTS

| | | | |
|---|---|---|---|
| 3,852,774 | 12/1974 | Taguchi et al. | 354/460 |
| 4,072,961 | 2/1978 | Yamada | 354/459 |
| 4,076,977 | 2/1978 | Tsunekawa et al. | 354/425 |
| 4,209,245 | 6/1980 | Kawasaki et al. | 354/459 |
| 4,241,279 | 12/1980 | Numata | 354/427 |
| 4,329,030 | 5/1982 | Aihara et al. | 354/459 |

Primary Examiner—Russell E. Adams
Attorney, Agent, or Firm—Toren, McGeady & Associates

[57] ABSTRACT

A photometric circuit which has an operational amplifier and produces a result of light measurement with a logarithmic compression element arranged between the input and output terminals of the operational amplifier to logarithmically compress a signal obtained by photoelectric transducing a measured light is characterized by inclusion of a circuit which selectively switches the logarithmic compression element to short-circuit the input and output terminals of the amplifier between them. The photometric circuit includes a capacitor to be charged with a photo current; a switching circuit for discharging the electric charge of the capacitor; an amplifying circuit for amplifying the voltage of the capacitor; a computing circuit for performing a computing operation on the amplifying circuit and a reference value; a setting circuit for setting the reference value according to the output of the amplifying circuit produced while the electric charge of the capacitor is being discharged by the switching circuit. The photometric circuit is capable of accurately performing light measurement by virtue of these features.

31 Claims, 23 Drawing Figures

PHOTOMETRIC CIRCUIT

This is a continuation of application Ser. No. 662,259, filed Oct. 18, 1984 now abandoned.

BACKGROUND OF THE INVENTION

1. Field of the Invention

This invention relates to a photometric circuit to be used in a camera or the like, and more particularly to a photometric circuit which logarithmically compresses a result of a light measurement by utilizing the voltage-current characteristic of the p-n junction of semiconductors and integrates the result of the light measurement by means of a capacitor.

2. Description of the Prior Art

The photometric circuit of a camera or the like which measures light in a wide brightness range generally produces the result of a light measurement by logarithmically compressing it for the purpose of broadening the photometric range thereof. For example, a popularly known photometric circuit of the logarithmic compression type is arranged as shown in FIG. 1 of the accompanying drawings. The conventional photometric circuit shown in FIG. 1 uses a transistor as the logarithmic compression element. The circuit comprises an operational amplifier 1; a photo-sensitive element 2 which receives light to be measured and photo-electrically transduces the light with two terminals thereof connected to input terminals of the operational amplifier 1; a transistor 3 which is of the PNP type has its emitter connected to the output terminal of the operational amplifier 1, its collector to the cathode of the photo-sensitive element 2 (an inversion input of the operational amplifier 1) and its base to the anode of the photo-sensitive element 2; a reference voltage source 4; and an output terminal 5 for producing the result of light measurement. Furthermore, the operational amplifier 1 is arranged to receives an energizing voltage +Vcc.

A current flowing from the photo-sensitive element 2 is proportional to the intensity of light incident on the element 2. A signal corresponding to the light is thus supplied to the operational amplifier 1. Since the transistor 3, which acts as the logarithmic compression element, is connected to the operational amplifier 1, the result of a light measurement produced from the output terminal 5 is of a logarithmically compressed value. Assuming that the voltage of the reference voltage source 4 is Er (Er<<Vcc), the output voltage V which is produced from the output terminal 5 can be expressed as follows:

$$V = \frac{kT}{q} \ln \frac{I}{Io} + Er \qquad (a)$$

wherein,

K: Boltzmann's constant
q: elementary electric charge of electrons
T: absolute temperature
I: photo current flowing at the photo-sensitive element 2
Io: reverse biased saturation current As shown in Formula (a) above, a signal corresponding to the brightness of the light received is logarithmically compressed, so that the result of a light measurement can be obtained covering a wide range of light brightness.

However, with the conventional photometric circuit arranged as described above, when the quantity of light incident on the photo-sensitive element 2 decreases, the photo current flowing at the photo-sensitive element 2 decreases to a great extent. In that event, a long period of time is required before an offset voltage, which exists at both terminals of the photo-sensitive element 2, and an excessive accumulated electric charge, which exists on the side of the collector of the transistor 3, come to disappear. Then, during that period, it is difficult to accurately carry out light measurement. In other words, charging and discharging processes for floating capacity and excess storage charge require a long period of time and the response speed of the photometric circuit decreases when the photo current becomes very small in low brightness.

Meanwhile, there have been proposed some methods for charging and discharging the floating capacity from outside. For example, Japanese Laid-Open Utility Model Application No. SHO 50-31931 discloses such a method. However, since a switching element is connected to a high impedance part of a logarithmic compression circuit in accordance with these methods, an error occurs since the floating capacity or a leakage current increases in such a case. Furthermore, in cases where an integration value of the light intensity must be obtained, such as with a flash device, the conventional photometric circuit of another type is arranged, as shown in FIG. 2, to have the photo current which flows at the photo-sensitive element 2 integrated directly by a capacitor 6; and the integrated result of light measurement is obtained from the output terminal 5, which is connected to the output terminal of the operational amplifier 1. However, in the event that the amplifier 1 which is used for amplifying the voltage of the capacitor 6 has an offset voltage, the photometric circuit has a photometric error. To solve this problem by reducing the offset voltage of the amplifier 1, an expensive amplifier of complex structural arrangement has been used. Furthermore, it is conceivable to use the same photo-sensitive element and the same operational amplifier for both the mode in which the result of light measurement is produced by logarithmically compressing it and for another mode in which the result of light measurement is produced by integrating it. An example of the conventional photometric circuits of this type is shown in FIG. 3. In this case, a change-over switch 7 is connected in series with the photo-sensitive element 2. The switch 7 shifts its connecting position to one side 7c connecting with a diode 9 for the logarithmic compression mode and the other side 7b connecting with the capacitor 6 for the integrating mode. This arrangement thus permits the use of the same photo-sensitive element 2 and operational amplifier 1 for the two modes. Furthermore, a switch 8 is connected parallel with the capacitor 6. When the switch 8 turned on, the capacitor 6 is reset with its two terminals shortcircuited.

In the case of the photometric circuit which is arranged as mentioned above, however, a leakage current occurs through the mode change-over switch 7 and the other switch 8 for resetting the capacitor 6 since they are connected to the inversion input terminal of the operational amplifier 1 which has an extremely high impedance. This leakage current and floating capacity bring about an error in the result of light measurement and thus necessitates a long period of time to obtain accurate light measurement.

The present invention is directed to the solution of the above-stated problem of the prior art. It is therefore an object of the invention to provide a photometric circuit which is capable of always correcting the offset voltages of a switching element and an amplifier, despite their magnitude and variations.

The above and further objects and features of the invention will become apparent from the following detailed description of preferred embodiments thereof taken in conjunction with the accompanying drawings.

SUMMARY OF THE INVENTION

To attain the first object of the invention, an embodiment of the invention is arranged as follows: The part between the input and output terminals of an operational amplifier is short-circuited by selectively subjecting a logarithmic compression element to switching control so that a floating capacity and an excess storage charge can be charged or discharged at any desired time with a simple circuit arrangement. Thus, a photometric circuit with great accuracy can be obtained.

Furthermore, in another embodiment, the logarithmic compression element is arranged to be a switching element; and an integrating element and the logarithmic compression element are connected in parallel so that an accurate and simple photometric circuit can be obtained.

DETAILED DESCRIPTION OF THE PREFERRED EMBODIMENTS

Figure 1:
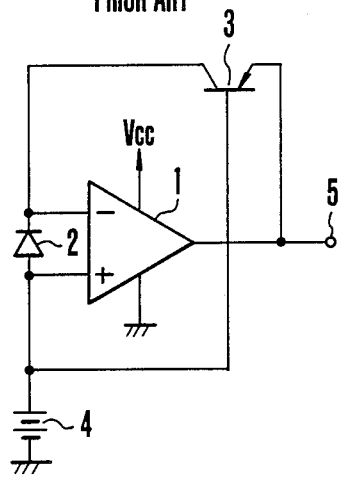
FIG. 1 is a circuit diagram showing a conventional photometric circuit of the type operating in a logarithmic compressing mode.
Figure 2:
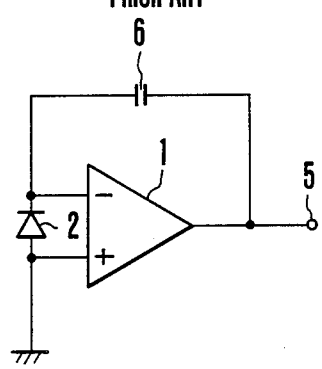
FIG. 2 is a circuit diagram showing another conventional photometric circuit which is of the type operating in an integrating mode.
Figure 3:
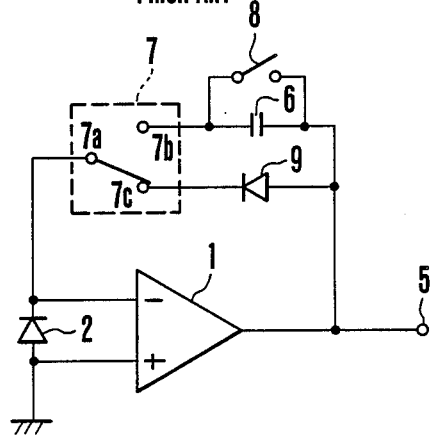
FIG. 3 is a circuit diagram showing a further example of the conventional photometric circuit of the type having both the logarithmic compression mode and the integrating mode.
Figure 4:
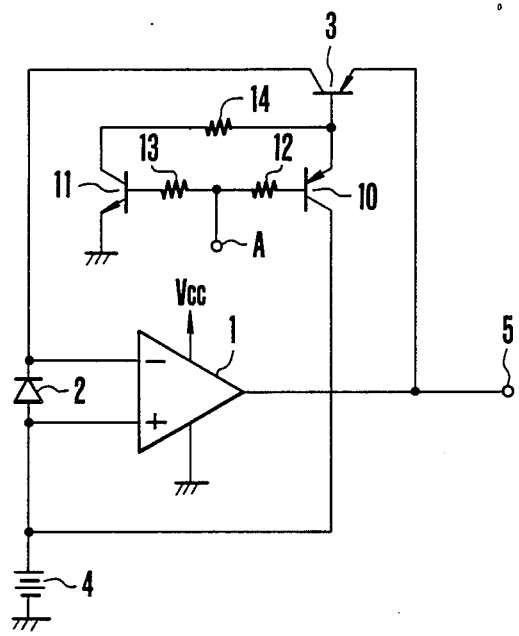
FIG. 4 is a circuit diagram showing a photometric circuit in a first embodiment of the present invention.

The following describes embodiments of the invention with reference to the accompanying drawings:

FIG. 4 shows a photometric circuit as a first embodiment. In FIG. 4, the same parts as those shown in FIGS. 1–3 are identified by the same reference numerals and are omitted from description here. This embodiment includes a PNP transistor 10 and an NPN transistor 11. These transistors 10 and 11 form a circuit which serves as logarithmic comressing means which short-circuits a part between the input and output terminals of the operational amplifier 1 by selectively switching the transistor 3. The bases of the transistors 10 and 11 are connected to each other via resistors 12 and 13. Another resistor 14 is connected between the collector of the transistor 11 and the base of the transistor 3.

The photometric circuit, which is arranged according to the invention as described above, operates in the following manner: When the potential at a point A connecting the resistors 12 and 13 to each other becomes the ground level (the point A is grounded), the transistor 11 turns off as its base also reaches the ground level. Meanwhile, the other transistor 10 turns on as a base current flows thereto via the resistor 12. Under this condition, the photometric circuit becomes equivalent to the circuit of FIG. 1. The same voltage as the voltage expressed by Formula (a) given in the foregoing is thus produced from the output terminal 5. The circuit thus gives the result of light measurement which is logarithmically compressed. Next, when the potential of the point A is raised to a high level (Vcc), the junction part between the base and emitter of the transistor 10 is inversely biased turning off the transistor 10. The other transistor 11, on the other hand, turns on as a base current flows thereto via the resistor 13. A base current flows to the transistor 3 via the resistor 14 to turn it on. As a result, the output and inversion input (-) of the operational amplifier 1 are short-circuited by the transistor 3 bringing about switching. Then, an offset voltage existing between the two terminals of the photosensitive element 2 and an excess charge accumulated on the collector side of the transistor 3 promptly disappears. Then, when the potential of the point A is again lowered to the ground level accurate light measurement can be obtained in a manner as expressed by Formula (a).

In the photometric circuit according to the invention, as mentioned in the foregoing, the logarithmic compression element is arranged to operate as a switching element by itself. The element is thus selectively operated to serve as a diode on one occasion and to short-circuit on another. Unlike the conventional arrangement, the circuit of the subject invention does not have an external circuit connected to the inversion input side of an operational amplifier 1 of a high impedance. Therefore, no error occurs since the floating capacity and a leakage current never increase. Another advantage of the embodiment is that the circuit is suited for use with an integrated circuit. In this specific example, the PNP type transistor 10 is used as the logarithmic compression element. However, the circuit can be arranged in the same manner as described above by replacing the PNP type transistor 10 with an NPN type transistor. As described in the foregoing, in the first embodiment, a part between the input and output terminals of the operational amplifier 1 is short-circuited with the logarithmic compression element 10 itself placed under selective switching control. This arrangement permits highly accurate light measurement without delay even for low level light, since the floating capacity and the excessive accumulated charge can be charged and discharged at any desired point of time with a simple circuit arrangement.

Figure 5:
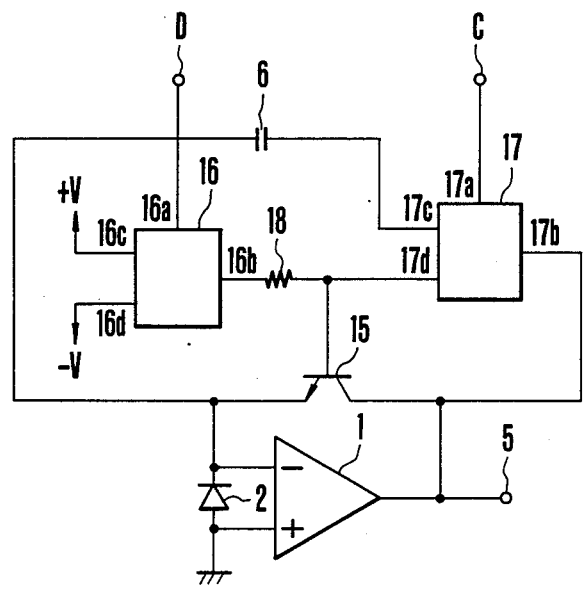
FIG. 5 is a circuit diagram showing a second embodiment of the invention.

FIG. 5 shows in a circuit diagram a second embodiment of the invention. A transistor 15, which is employed as a logarithmic compression element, has its emitter and collector respectively connected to the inversion input terminal and the output terminal of the operational amplifier 1. Switch circuits 16 and 17 bring about switch-over between a logarithmic compressing mode and an integrating mode. When control terminals 16a and 17a of the switch circuits 16, 17 are at high levels, terminals 16b and 16c and terminals 17b and 17c become conductive. When these control terminals 16a and 17a are at low levels, terminals 16b and 16d and terminals 17b and 17d become conductive. The terminal 16b of the switch circuit 16 is connected via a resistor 18 to the base of the transistor 15 and the terminal 17d of the switch circuit 17. The terminal 16c is connected to a positive power supply +V and the terminal 16d to a negative power supply −V, respectively. The terminal 17b of the switch circuit 17 is connected to the output terminal of the operational amplifier 1 and the collector of the transistor 15. The terminal 17c is connected to one terminal of a capacitor 6. As mentioned above, the logarithmic compression element is formed by a switching element (or the transistor 15). A series circuit, which is formed by series connecting another switching element (or the switch circuit 17) to the capacitor 6, is connected in parallel with the transistor 15. Since a photo current which flows at the photo-sensitive element 2 is extremely small, the input of the operational amplifier 1 is obtained via an FET of the MOS or junction type. The capacity of the capacitor 6 is set at a value between several ten PF and several ten thousand PF according to the required precision of the circuit and signal intensity. The second embodiment, which is arranged in this manner, operates in the following manner:

(i) When the level of the terminal C of FIG. 5 is lowered, that is, when the level of the control terminal 17a of the switch circuit 17 is low, the base and collector of the transistor 15 are short-circuited between them. The transistor 15 then operates as a diode formed by the PN junction between the base and emitter thereof. This functions as a logarithmic compression diode. The output terminal 6 produces a voltage of a value obtained by logarithmically compressing the photo current of the photo-sensitive element 2.

(ii) Next, when the levels of terminals C and D are both high, the terminals 17b and 17c of the switch circuit 17 become conductive. Then, the capacitor 6 is connected to the output terminal of the operational amplifier 1. Furthermore, the terminals 16b and 16c of the switch circuit 16 become conductive, causing the base of the transistor 15 to have a positive potential, and the transistor 15 turns on. Accordingly, the two terminals of the capacitor 6 are short-circuited via the switch circuit 17 and the transistor 15. The capacitor 6 is, therefore, reset.

(iii) When the levels of the terminals C and D become high and low, respectively, the terminals 17b and 17c of the switch circuit 17 become conductive. Therefore, the capacitor 6 is connected to the output terminal of the operational amplifier 1 via the switch circuit 17. Furthermore, since the terminals 16b and 16d of the switch circuit 16 become conductive, the base of the transistor 15 has a negative potential and the transistor 15 turns off. Under this condition, the output terminal 5 produces a value obtained by integrating the photo current of the photosensitive element 2 by means of the capacitor 6.

The second embodiment of the invention, as described above, is capable of selecting one mode in which the light measurement result is logarithmically compressed before it is produced, or another mode in which the light measurement result is integrated before it is produced, with the levels of the terminals C and D shifted. Furthermore, the capacitor 6 can be reset in a simple manner.

Figure 6:
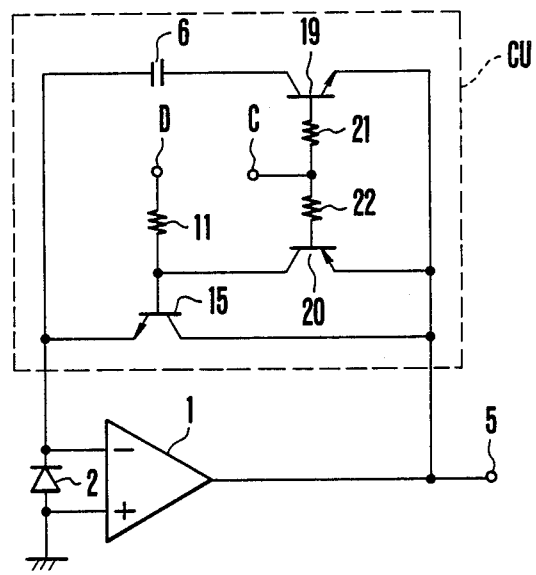
FIG. 6 is a circuit diagram showing a third embodiment of the invention.

FIG. 6 shows a third embodiment of the invention. The switch circuits 16 and 17 of FIG. 5 are formed, in this case, with transistors. In FIG. 6, the same parts as those of FIG. 5 are identified by the same reference numerals. The third embodiment includes a transistor 19 which is connected between a capacitor 6 and the output terminal of the operational amplifier 1; and the transistor 20 which is connected between the base of a transistor 15 and the transistor 19. The base of the transistor 20 is connected to the base of the transistor 19 via resistors 21 and 22. With the photometric circuit arranged in this manner, a control operation is performed by shifting the level of the connection point (or the terminal C) disposed between the base resistors 21 and 22 of the transistors 19 and 20 and the level of the terminal D, which is connected to the base resistor 18 of the transistor 15. The third embodiment operates as follows:

When the level of the terminal C is raised to a high level, a base current flows to the transistor 19 via the resistor 21 to turn on the transistor 19. The transistor 20 turns off as the part between the base and the emitter of the transistor 20 is then inversely biased between them. This condition corresponds to the condition obtained in the preceding embodiment (FIG. 5) when the terminal C is at a high level.

When the level of the terminal C becomes low, a base current flows to the transistor 20 to turn it on, while the transistor 19 turns off since no base current flows thereto. This condition corresponds to the condition obtained in the preceding embodiment with the level of its terminal C (FIG. 5) becoming low.

With the level of the terminal D likewise shifted to a high or a low level, the transistor 15 turns on or off respectively giving a condition corresponding to the condition obtained in the preceding embodiment with the level of the terminal D of FIG. 5 shifted to a high or low level. The third embodiment is thus capable of performing the same control as the second embodiment by shifting the levels of the terminals C and D. For example, the level of the terminal C is shifted to a low level and that of the terminal D to a high level for the logarithmically compressing mode to obtain the same result as in paragraph (i) above. Furthermore, in resetting the capacitor 6, the levels of both the terminals C and D are shifted to high levels to obtain the same result as in paragraph (ii). In the integrating mode, the level of the terminal C is shifted to a high level and that of the terminal D to a low level to obtain the same result as in paragraph (iii) described in the foregoing.

Figure 7:
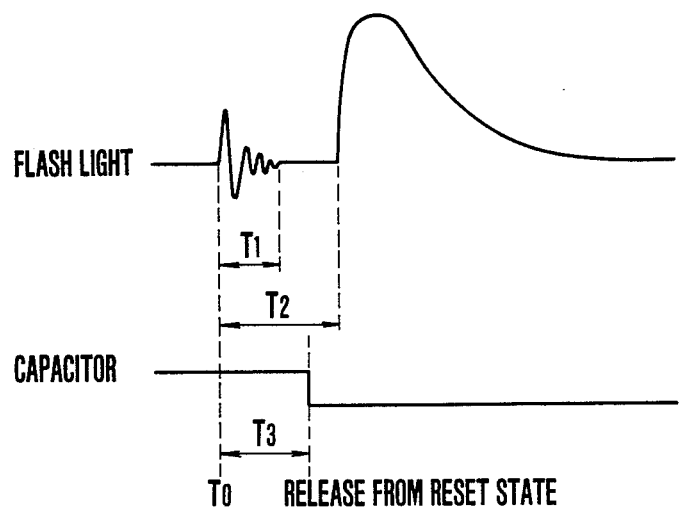
FIG. 7 is an illustration which shows the timing in releasing a reset condition the in measuring the light of a flash device.

In the event of light measurement in the integrating mode with a flash device, the operation of each of the embodiments described above is as follows: It is important in this instance that the electric charge accumulated at the capacitor 6, which integrates a photo current obtained by the flash device, is reset and released from the reset-condition at the correct timing. FIG. 7 shows time for triggering the flash device for flashing. With a synchronizing signal supplied to the flash device at a point of time T0, a triggering action is performed during a period of time T1 (several to several tens of μsec) and, after the lapse of a period of time T2, the flash device begins to flash. During this period T2, a noise of high amplitude and high voltage occurs and the capacitor 6 is charged with the noise degrading the accuracy of the integration circuit. The adverse effect of the noise from the flash device can be eliminated by keeping the capacitor 6 in a reset condition for a period of time T3, which is between the periods of time T1 and T2 (several to several tens of μsec). In other words, the adverse effect of the noise can be avoided by delaying the time of releasing the capacitor 6 from its reset condition by as much as several to several tens of μsec after the triggering of the flash device.

The advantages of the second and third embodiments: The logarithmic compression element is formed by a switching element. The integrating element and the logarithmic compression element are connected in parallel. This arrangement lessens the error of light measurement and enhances the accuracy thereof. The use of transistors or the like permits a simplified circuit arrangement.

Figure 8:
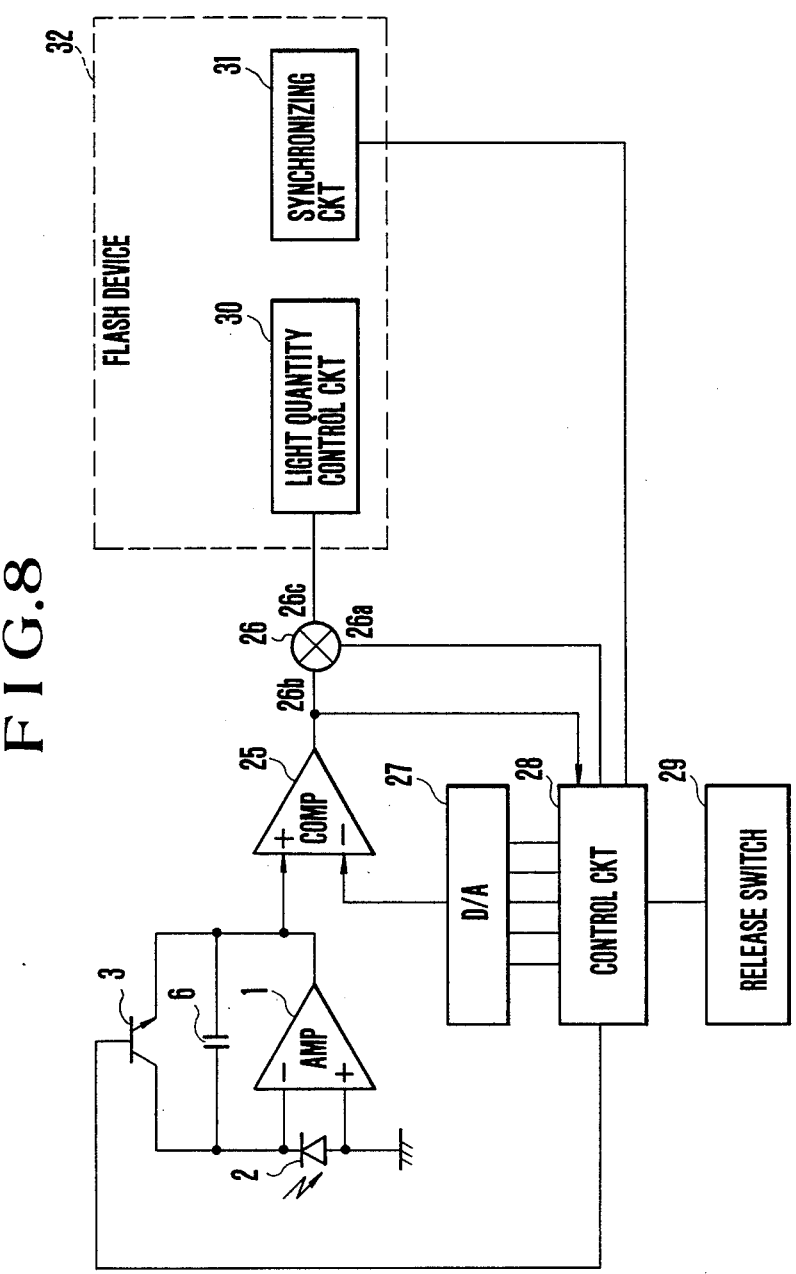
FIG. 8 is a circuit diagram showing a fourth embodiment of the invention.
Figure 9:
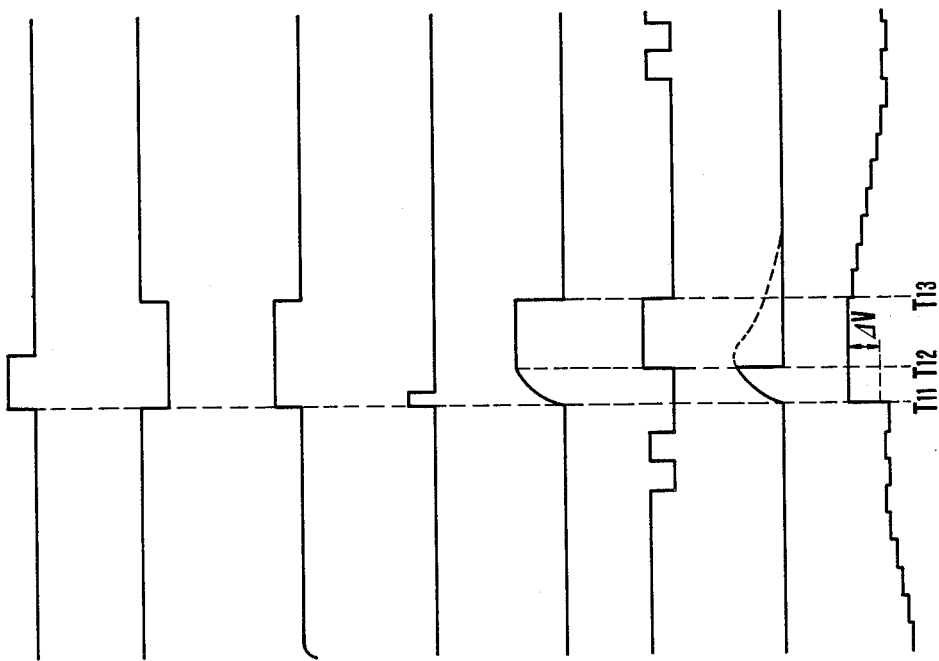
FIGS. 9(a)–9(h) show, in a timing chart, the operations of the various parts of FIG. 8.

A fourth embodiment of the invention is as follows: FIG. 8 shows the fourth embodiment of the photometric circuit embodying the invention, which, in this case, is applied to the control of a flash device. In FIG. 8, the same parts as those shown in FIGS. 1-7 are identified by the same reference numerals. The control terminal of the transistor 3 is connected to a control circuit 28. A comparator 25 serves as computing means. The comparator 25 has its inversion input terminal connected to the output terminal of a D/A (digital-to-analog) converter 27 and its output terminal to a terminal 26b of an analog switch 26 and also to the control circuit 28. The analog switch 26 has its terminals 26b and 26c interconnected when a control terminal 26a is at a high level and is not interconnected when the control terminal 26a is at a low level. The terminal 26a of the analog switch 26 is connected to the control circuit 28. The terminal 26c of the switch 26 connected to a light quantity control circuit 30 of a flash device 32. The light quantity control circuit 30 functions to immediately stop the flash device 32 from flashing if the flash device 32 is flashing when a positive pulse is received via the analog switch 26. The D/A converter 27 serves as setting means and converts a digital input from the control circuit 28 into an analog value and supplies its output as a reference value to the inversion input terminal of the comparator 25. The control circuit 28 receives the output of a release switch 29 and, on the basis thereof, controls the switching element 3, the analog switch 26, the D/A converter 27 and the synchronizing circuit 31 of a flash device 32 in a manner shown in FIG. 9. The synchronizing circuit 31 causes a flash tube or the like of the flash device 32 to flash based on a control signal received from the control circuit 28. Futhermore, in FIG. 8, the elements 1-3, 6 and 25-28 are shown located outside the flash device 32. It is, however, possible to have some of or all of them arranged within the flash device 32. The flash device 32 may be a known device of the kind having a xenon flash tube. The fourth embodiment of the invention, which is arranged in this manner, operates as described below:

Referring to FIGS. 9(a)-9(h), before a point of time T11 at which a release action is performed, the control voltage of the switching element 3 is at a high level and the element 3 is on, as shown in FIG. 9(b). The control terminal 26a of the analog switch 26 is at a low level, as shown in FIG. 9(c). The terminals 26b and 26c of the analog switch 26 are non-conductive. As a result, a voltage which is dependent on the offset voltage, of the operational amplifier 1 and an on-voltage of the switching element 3, is generated at the output terminal of the operational amplifier 1. Furthermore, during this period, the voltage output of the comparator 25 is never supplied to the light quantity control circuit 30. Under this condition, the control circuit 28, D/A converter 27 and comparator 25 operate as follows: The control circuit 28 increases the input of the D/A converter 27 by one count step if the output level of the comparator 25 is high and decreases it by one count step if the output level of the comparator 25 is low. With the control circuit 28 operating in this manner, the voltage output of the D/A converter 27 is eventually equalized with the voltage output of the operational amplifier 1 with an error less than one count step . With the resolution of the D/A converter 27 sufficiently small, this value can be considered equal to the output of the operational amplifier 1.

When the release switch 29 is turned on at the point of time T11, the control circuit 28 brings the level of the control terminal of the switching element 3 to a low level, as shown in FIGS. 9(b), 9(c) and 9(d). The switching element 3 is turned off by this. The level of the control terminal 26a of the analog switch 26 then becomes high making the terminals 26b and 26c conductive between them. At the same time, the input of the D/A converter 27 is increased by a number of count steps ΔV by adding it to a value obtained immediately before the release switch 29 is turned on. By this, the potential of the inversion input of the comparator 25 becomes higher by ΔV as shown in FIG. 9(h). Then, as shown in FIG. 9(d), a positive short pulse is supplied to the synchronizing circuit 31 causing the flash device 32 to flash as shown in FIG. 9(g). The flash light from the flash device 32 illuminates an object to be photographed. The object reflects this light. The reflection light from the object is photoelectrically converted by the photo-sensitive element 2. Then, a current, which is in proportion to the light incident on the element 2, flows from the element 2 to charge the capacitor 6. The output of the comparator 25 changes from a low to a high level when the charge voltage of the capacitor 6 exceeds the value ΔV (at a point of time T12). Then, a positive pulse is supplied to the light quantity control circuit 30 stopping the flashing operation. The length of time for which the flashing operation lasts (T12-T11) is, for example, several to several hundred msec.

In accordance with the invention, as described in the foregoing, the component which is dependent on the on-voltage of the switching element 3 and the offset voltage of the amplifier 1 has already been detected before commencement of a photometric operation. Therefore, light measurement can be carried out accurately without error, even when these voltages exist.

Figure 10:
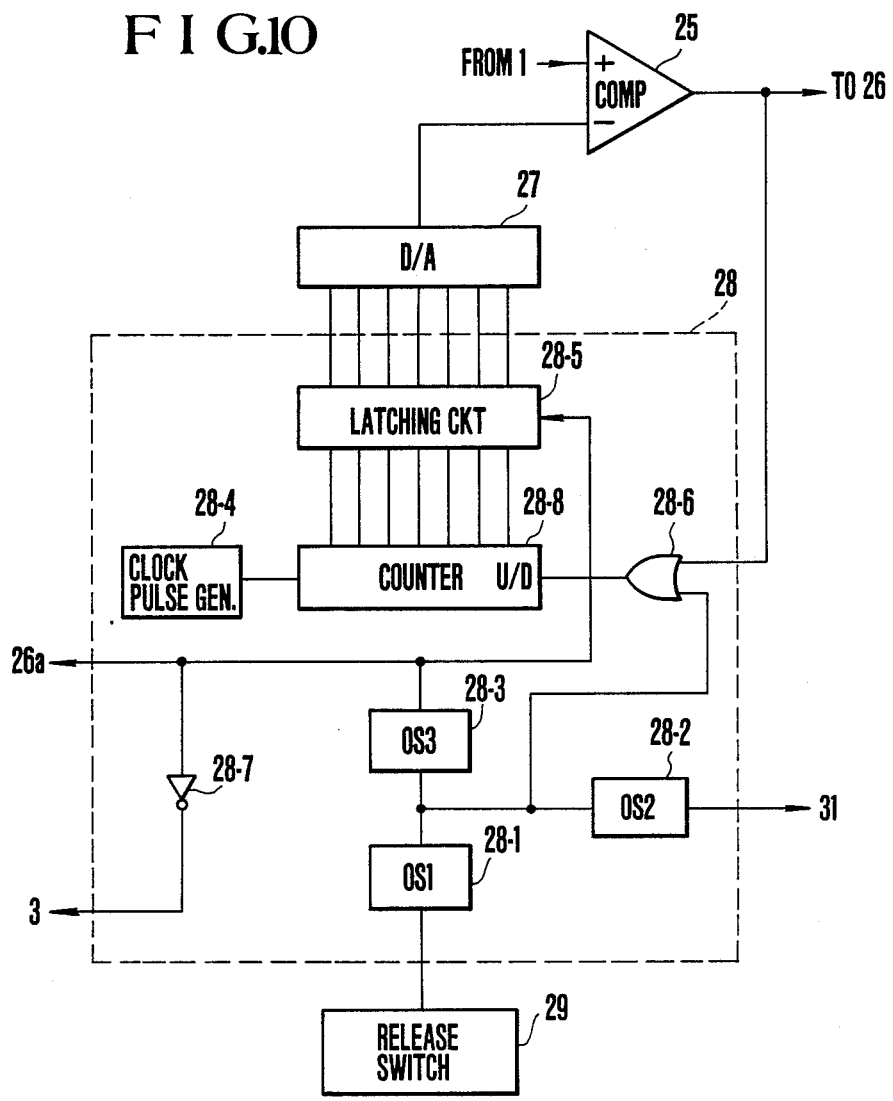
FIG. 10 is a circuit diagram showing the details of a control circuit.
Figure 11:
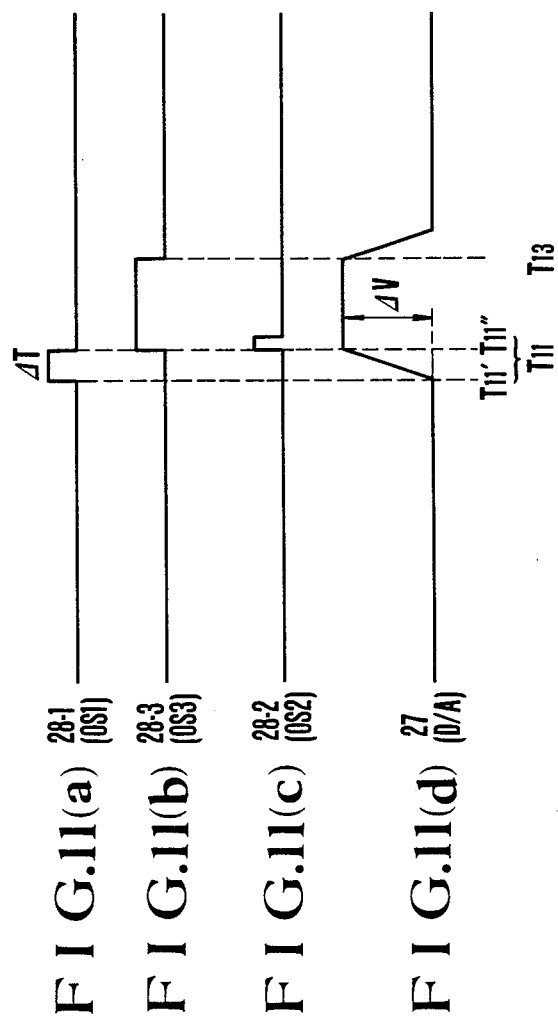
FIGS. 11(a)–11(d) show, in a timing chart, the timing of operations of the various parts of the control circuit.

FIG. 10 shows the details of the control circuit 28 shown in FIG. 8. The operation of the control circuit 28 will be further described below with reference to FIG. 10 and FIGS. 11(a)-11(d):

The control circuit 28 includes one-shot circuits 28-1, 28-2 and 28-3; an up-down counter 28-i; a clock pulse generator 28-4; a latching circuit 28-5; an OR circuit 28-6; and an inverter 28-7. They are connected as shown in FIG. 10.

Referring to FIGS. 11(a)–11(d), the one-shot circuit 28-1 produces a pulse with a pulse width of ΔT in synchronization with a release signal at a point of time T11′. While this pulse is at a high level, the output level of the OR gate 28-6 becomes high. Therefore, the counter 28-8 reaches a count-up condition. The counter 28-8 counts the output of the clock pulse generator 28-4 and counts up a value corresponding to the value ΔV. Both the one-shot circuits 28-3 and 28-2 produce pulses in synchronization with the fall of the output of the one-shot circuit 28-1 (at the point of time T11″). The output of the circuit 28-2 causes the synchronizing circuit 31 to operate. Then, a flashing operation begins. Furthermore, the output of the circuit 28-3 turns on the analog switch 26 and turns off the switching element 3. While the output of the circuit 28-3 is at a high level, the latching circuit 28-5 performs a latching operation. With the embodiment arranged in this manner, information on the on-voltage of the switching element 3 and the offset of the amplifier 1 is stored in a digital manner, so that a reference value can be very accurately corrected or adjusted. This digital arrangement, however, may be replaced with an arrangement to store the error component of a photometric output in an analog mannner.

Figure 12:
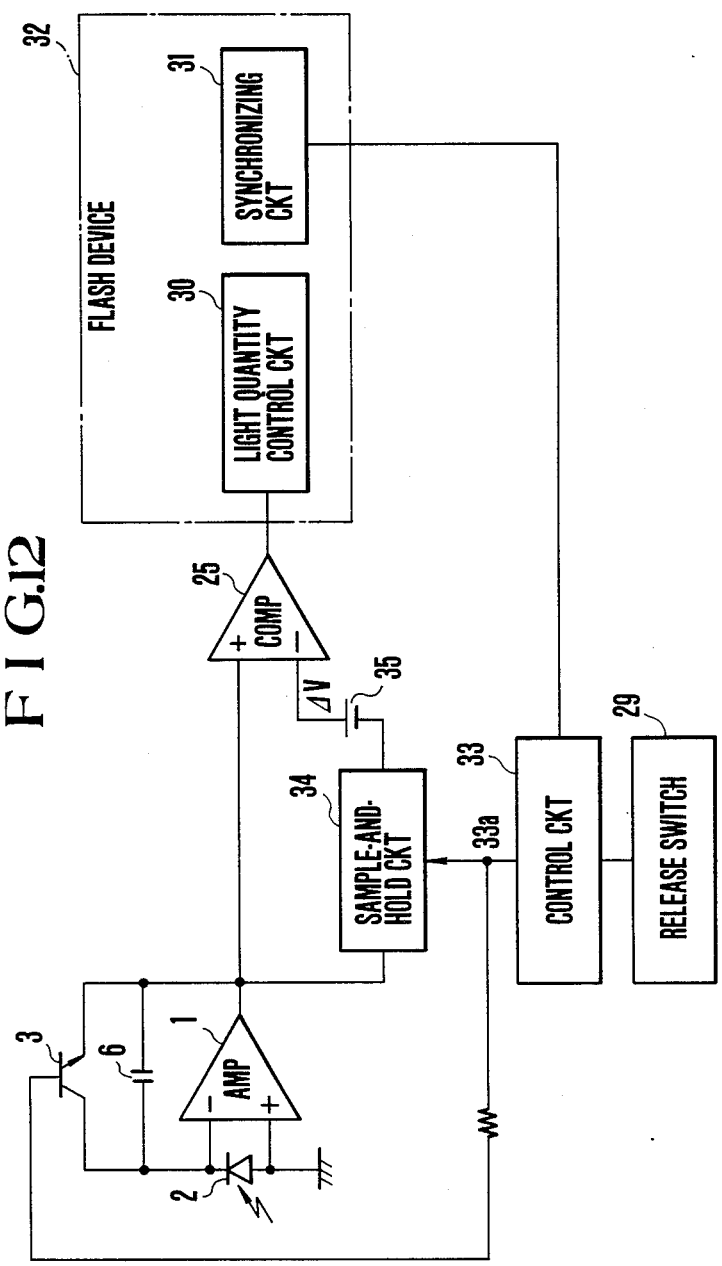
FIG. 12 is a circuit diagram showing a fifth embodiment of the invention.

FIG. 12 shows an example of such an arrangement in a fifth embodiment of the invention. The same elements as those shown in FIGS. 1–11 are identified by the same reference numerals. The fifth embodiment includes a control circuit 33; a sample-and-hold circuit 34 which serves as setting means; and a power source 35 which produces a voltage ΔV. The circuit arrangement of the embodiment is greatly simplified. The output 33a of the control circuit 33 is at a high level until the release switch 29 produces an output. Under that condition, the element 3 is on and the electric charge of the capacitor 6 is discharged. Furthermore, while the output 33a of the control circuit 33 is at the high level, the sample-and-hold circuit 34 is sample-and-holding the error component of the output of the amplifier 1.

When the release switch 29 is turned on, the level of the output 33a of the control circuit 33 becomes low. The element 3 turns off. A charging process begins on the capacitor 6. Meanwhile, the sample-and-hold circuit 34 holds a value obtained immediately before the release switch 29 is turned on. Therefore, the comparator 25 receives at its inversion input terminal a reference voltage which is the sum of the voltage ΔV and an error voltage which is sampled and held by the circuit 34. The comparator 25 compares the charge voltages of the capacitor 6 with the reference voltage which is obtained with the on-voltage of the switching element 3 and the offset voltage of the amplifier 1 superimposed on the voltage ΔV. Then, timing for stopping the flash device 32 from flashing (adjustment of flash light) is controlled on the basis of the output of the comparator 25.

In the specific embodiment, the photometric circuit measures reflected light resulting from emission of a flash light. However, the invention is not limited to such applications. The invention is, of course, also applicable to a photometric circuit of the kind arranged to concurrently begin measuring light with the opening or closing operation of a shutter in a silver-halide film type camera. Furthermore, in the foregoing description, the comparator 25 is employed as computing means. However, the invention is not limited to such a discerning or judging arrangement but is also applicable to any photometric circuit that performs a computing process on a light measurement value together with parameters of various kinds.

In the embodiment described above, the on-voltage of the switching element 3 and the offset of the amplifier 1 are detected and stored before commencement of a photometric operation. The stored datum is then used in the computing operation on the light measurement information. The embodiment is therefore capable of performing a photometric operation with great accuracy.

Figure 13:
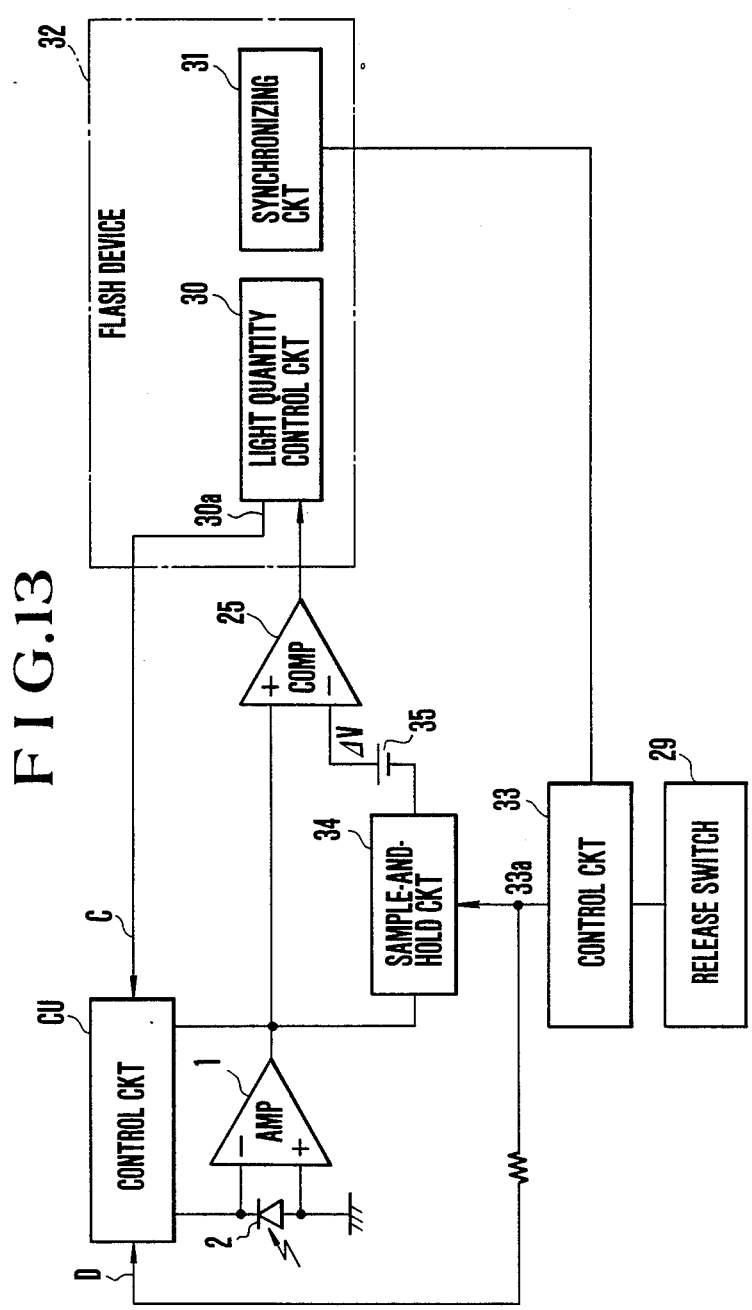
FIG. 13 is a circuit diagram showing a sixth embodiment of the invention.

FIG. 13 shows a sixth embodiment of the invention. This embodiment represents an improvement on the fifth embodiment. In FIG. 13, the same elements as those shown in FIGS. 1–12 are identified by the same reference numerals. The sixth embodiment includes a control unit CU which is connected between the input and output terminals of the operational amplifier 1. The output terminal of the control circuit 33 is connected to a terminal D of the control unit CU. A terminal of the light quantity control circuit 30, which produces a charge completion signal 30a, is connected to another terminal C of the control unit CU. The charge completion signal 30a is at a high level after completion of a charging process on a main capacitor provided within a flash device 32 and remains at a low level unit then. A control signal 33a, which is produced from the control circuit 33, stays at a low level until the release switch 29 turns on. When the switch 29 turns on, the level of the control signal 33a becomes low.

Accordingly, when the level of the charge completion signal 30a becomes high, the control unit CU automatically assumes the integrating mode and begins to perform an integrating operation in response to a release signal. However, since the floating charge on the inversion input side of the operational amplifier 1 can be cleared before the commencement of the integrating operation, the photometric operation can be carried out with little error. Furthermore, since the output of the amplifier 1 produced immediately before commencement of the integrating operation is stored at the sample-and-hold circuit 34, the offset of the amplifier 1 can also be cancelled.

What is claimed is:

1. A photometric circuit comprising:
   (a) a capacitor to be charged by photo current;
   (b) switching means for discharging the electric charge of said capacitor;
   (c) amplifying means for amplifying the voltage of said capacitor;
   (d) operating means for performing an operation on the output of said amplifying means and a reference value;
   (e) detecting means for detecting output level of said amplifying means while the electric charge of said capacitor is being discharged by said switching means; and
   (f) setting means for setting said reference value according to an output of said detecting means.

2. A circuit according to claim 1, further comprising photo-electric converting means for forming said photo current.

3. A circuit according to claim 1, wherein said amplifying means includes an operational amplifier.

4. A circuit according to claim 1, wherein said setting means includes storing means for storing the output of said amplifying means produced while the electric charge of said capacitor is being discharged by said switching means.

5. A circuit according to claim 4, wherein said storing means includes a sample-and-hold circuit.

6. A circuit according to claim 4, wherein said storing means includes a latching circuit.

7. A photometric circuit, comprising:
   (a) a capacitor to be charged by photo current;
   (b) amplifying means for amplifying the voltage of said capacitor;
   (c) operating means for performing an operation on the output of said amplifying means and a reference value;
   (d) detecting means for detecting output level of said amplifying means produced immediately before commencement of a charging process on said capacitor; and
   (e) setting means for setting said reference value according to an output of said detecting means.

8. A circuit according to claim 7, further comprising photo-electric converting means for forming said photo current.

9. A circuit according to claim 7, wherein said amplifying means includes an operational amplifier.

10. A circuit according to claim 7, wherein said setting means includes storing means for storing the output of said amplifying means produced while the electric charge of said capacitor is being discharged by said switching means.

11. A circuit according to claim 10, wherein said storing means includes a sample-and-hold circuit.

12. A circuit according to claim 10, wherein said storing means includes a latching circuit.

13. A metering circuit, comprising:
   (a) a capacitor to be charged by current;
   (b) a semiconductor switching device for discharging the electric charge of said capacitor;
   (c) amplifying means for amplifying the voltage of said capacitor;
   (d) control means for controlling said semiconductor switching device, said control means having a first mode for turning on said semiconductor switching device for effecting said discharging, and a second mode for causing said semiconductor switching device to function as a non-linear conversion element.

14. A circuit according to claim 13, further comprising photo-electric converting means for forming said photo current.

15. A circuit according to claim 13, wherein said amplifying means includes an operational amplifier.

16. A circuit according to claim 13, further comprising:
   breaking means for cutting off a charging route leading to said capacitor while said semiconductor switching device is being caused to function as logarithmic compression means by said control means.

17. A circuit according to claim 13, wherein said semiconductor switching device includes a transistor.

18. A circuit according to claim 17, wherein said control means includes short-circuiting means for short-circuiting some of the terminals of said transistor.

19. A photometric circuit, comprising:
   (a) photo-electric converting means for forming an electric signal corresponding to a quantity of light;
   (b) amplifying means for amplifying the output of said photo-electric converting means;
   (c) a semiconductor logarithmic compression device for logarithmically compressing the output of said photo-electric converting means, said semiconductor logarithmic compression device being connected between the input and output terminals of said amplifying means; and
   (d) control means for causing said semiconductor logarithmic compression device to turn on to short-circuit said input and output terminals of said amplifying means.

20. A circuit according to claim 19, wherein said amplifying means includes an operational amplifier.

21. A circuit according to claim 19, wherein said semiconductor logarithmic compression device includes a transistor.

22. A photometric circuit, comprising:
   (a) a capacitor to be charged by photo current;
   (b) a semiconductor switching device for discharging the electric charge of said capacitor;
   (c) amplifying means for amplifying the voltage of said capacitor;
   (d) control means for causing said semiconductor switching device to function as logarithmic compression means for logarithmically compressing said photo current;
   (e) operating means for performing an operation on the output of said amplifying means and a reference value; and
   (f) detecting means for detecting the output level of said amplifying means while the electric charge of said capacitor is being discharged by said switching means; and
   (g) setting means for setting said reference value according to an output of said detecting means.

23. A circuit according to claim 22, further comprising photo-electric converting means for forming said photo current.

24. A circuit according to claim 22, wherein said amplifying means includes an operational amplifier.

25. A circuit according to claim 22, wherein said setting means includes storing means for storing the output of said amplifying means produced while the electric charge of said capacitor is being discharged by said semiconductor switching device.

26. A circuit according to claim 25, wherein said storing means includes a sample-and-hold circuit.

27. A circuit according to claim 25, wherein said storing means includes a latching circuit.

28. A circuit according to claim 22, further comprising:
   breaking means for cutting off a charging route leading to said capacitor while said semiconductor switching device is being caused to function as logarithmic compression means by said control means.

29. A circuit according to claim 22, wherein said semiconductor switching device includes a transistor.

30. A circuit according to claim 29, wherein said control means includes short-circuiting means for short-circuiting some of the terminals of said transistor.

31. A circuit according to claim 22, wherein said control means preventing semiconductor said switching device from functioning as logarithmic compression means when a flash device becomes a stand-by state.

* * * * *